United States Patent [19]

Taniguchi et al.

[11] Patent Number: 5,025,329
[45] Date of Patent: Jun. 18, 1991

[54] ELECTRONICALLY CONTROLLED MAGNETIC TAPE EDITING DEVICE

[75] Inventors: Hiroshi Taniguchi; Kanji Kubo, both of Hirakata; Hiromi Nakase, Osaka, all of Japan

[73] Assignee: Matsushita Electric Industrial Co., Ltd., Osaka, Japan

[21] Appl. No.: 371,287

[22] Filed: Jun. 26, 1989

[30] Foreign Application Priority Data

Jun. 28, 1988 [JP] Japan .................. 63-160057

[51] Int. Cl.$^5$ ............................................ G11B 5/592
[52] U.S. Cl. ........................... 360/77.16; 360/14.1
[58] Field of Search ............... 360/77.14, 77.15, 77.16, 360/14.1

[56] References Cited

U.S. PATENT DOCUMENTS 4,093,885 6/1978 Brown ................... 360/77.16 X
4,486,796 12/1984 Sakamoto ............... 360/77.16 X

FOREIGN PATENT DOCUMENTS 2138621 10/1984 United Kingdom ........... 360/77.16

Primary Examiner—Vincent P. Canney
Assistant Examiner—David L. Robertson
Attorney, Agent, or Firm—Stevens, Davis, Miller & Mosher

[57] ABSTRACT

A device is provided for electronically editing and recording new signals on recorded tracks on a recording medium. Reproduction is started from the track just before an editing point and a magnetic head mounted on an electro-mechanical converting element traces the curvature of the reproducing track. A deviation amount of the electro-mechanical converting element upon reproduction of the track just before the editing point is detected by a strain detecting sensor mounted on the electro-mechanical converting element. The detection signal is sampled at a plurality of sample points and stored in a memory circuit. When the head reaches the editing point, the head is set into the recording mode. The electro-mechanical converting element on which the head is mounted is deviated in accordance with the curvature information of the reproducing track just before the editing point and, at the same time, a closed loop control is executed such that a strain pattern in the track scan which is detected by the strain sensor mounted on the converting element coincides with a strain pattern of the strain sensor upon reproduction of the track just before the editing point which was stored. Due to this, the curvature characteristics of the recorded tracks before and after the editing point are made to coincide.

3 Claims, 4 Drawing Sheets

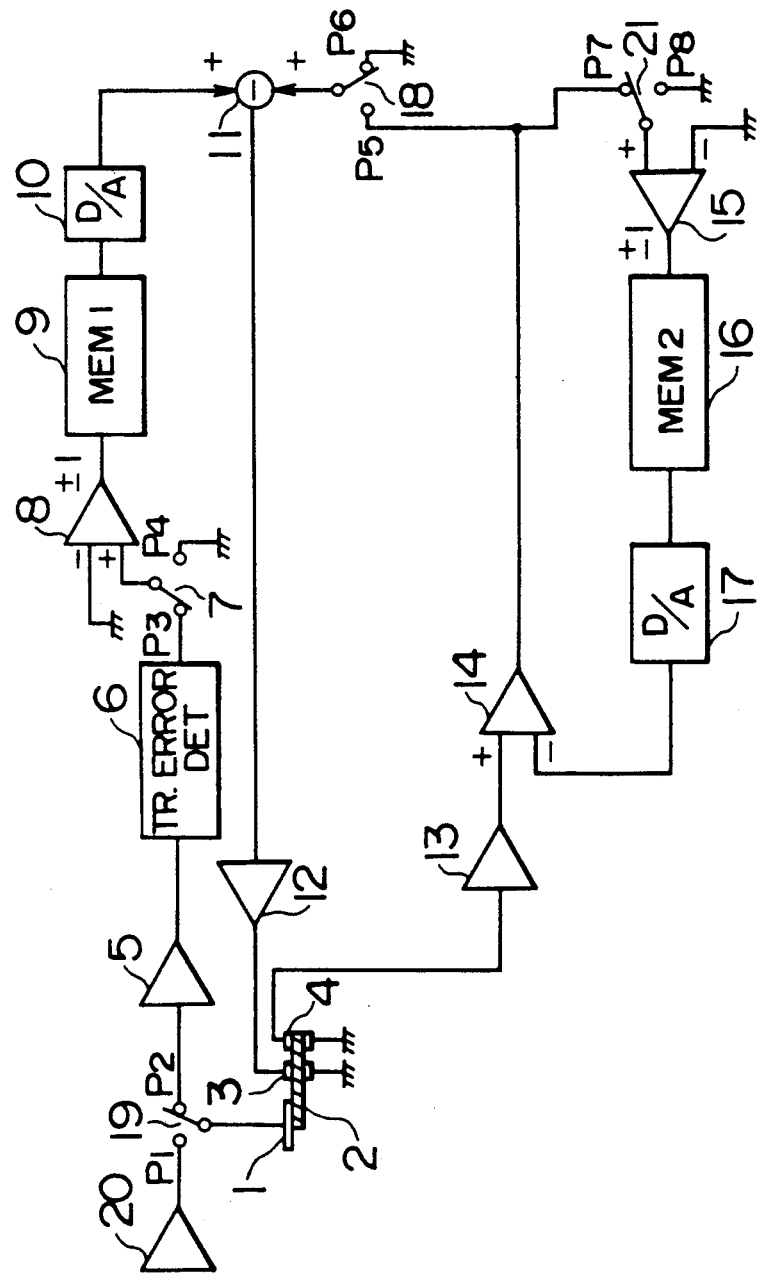
F I G. 1

ELECTRONICALLY CONTROLLED MAGNETIC TAPE EDITING DEVICE

BACKGROUND OF THE INVENTION

The present invention relates to an electronically controlled magnetic tape editor for video tape recorder (VTR), of helical scan type, or the like.

The electronic editing technique of the VTR has been put into practical use many years ago. However, the recording density of the VTR has greatly improved over the years and the narrow track recording is executed, so that electronic editing accuracy has become a factor which limits the realization of increased high density recording.

One limit of the recording density which causes a problem in electronic editing relates to the linearity (defined by a degree of curve from a straight line) between the recording track pitch and the track.

At present, in the helical scan type VTR having a rotary head cylinder whose diameter is about 70 mm$\phi$, the limit of the track linearity is about 5$\mu$m. When the linearity is set to about 5 $\mu$m, assuming that the linearity between the recorded track and the editing track which is subsequently recorded shows an opposite curve, a deviation of the linearity at an editing point is equivalently set to 10 $\mu$m. Therefore, to execute the electronic editing under such a condition without causing problems, it is desirable to set the track pitch to about 30 $\mu$m or more.

On the other hand, due to recent technological advances with respect to magnetic tapes and heads, the recording and reproducing picture quality performances can be derived even in the case of a track pitch of 10 $\mu$m or less. Further, there has also been known a dynamic tracking technique in which even when the recording track pitch is set to 10 $\mu$m and the linearity of the recording track is set to 5 $\mu$m, if each track has a curve of the same tendency, the reproduction is accurately executed along the recording track by the dynamic tracking which traces the curve in the reproducing mode.

However, in the case of performing electronic editing as mentioned above, when the video deck used to record first and the video deck which is used to execute the electronic editing differ, the track curves change discontinuously, particularly, at the positions before and after the editing point. Consequently, there occur phenomena such that the track overlap on the editing point track, the guard between tracks is widened, and the like. When reproducing the tape after the editing is completed, fluctuation of the reproduced image may occur. Effective means for avoiding such a problem in the case of the track pitch of about 20 $\mu$m or less has not been heretofore practically achieved.

SUMMARY OF THE INVENTION

In consideration of the above problems, it is an object of the present invention to solve the problem of image disorder at the editing point when using a narrow recording track in the editing operation due to the difference in curvature between the recorded track and the track which is newly recorded.

With respect to an electronic editor in an apparatus in which adjacent recording tracks are sequentially formed on a recording medium and a signal is recorded and reproduced, upon editing and recording, the reproduction is started from the track before the editing point, a reproducing head mounted on an electric/mechanical converting element is moved, thereby performing the reproduction in conformity with the curve of the reproduction track. A strain amount of the electro-mechanical converting elements upon reproduction of the track just before the editing point is detected by a strain sensor mounted on the electro-mechanical converting element and a detection signal of the strain sensor is stored as a digital value. When the reproducing head arrives at the editing point, the reproducing head is set into the recording mode. The electro-mechanical converting element onto which the head is mounted is actuated, thereby allowing a strain pattern in the track scan of the strain sensor mounted on the electro-mechanical converting element to trace the strain pattern of the strain sensor upon reproduction of the track just before the editing point which has been stored as the digital value.

The electro-mechanical converting element on which the head is mounted is actuated such that the reproducing head scans in conformity with the curve of the reproducing track just before the editing point. A deviation amount of the electro-mechanical converting element is detected by the strain sensor mounted on the electro-mechanical converting element. The strain amount of the strain sensor according to the deviation amount of the electro-mechanical converting element according to the curve of the reproducing track just before the editing point is stored as a digital value. When the head reaches the editing point, the head is set into the recording mode. The electro-mechanical converting element is actuated so as to provide the same pattern curve as the curve of the track just before the editing point. At this time, the electro-mechanical converting element is actuated in a closed loop manner so that the strain pattern of the strain sensor mounted on the electro-mechanical converting element actuated coincides with the strain pattern stored as the digital value. Thus, the stable control can be also executed for the disturbance.

According to the present invention, in a magnetic recording and reproducing apparatus of the rotary head type in which a head is attached to an open end of an electro-mechanical converting element whose one end is fixed, when executing the electronic edition, the reproduction of the recorded track is started from a position before an editing point, the electro-mechanical converting element is actuated so as to scan the head along a curve pattern of the reproducing track, the curve pattern of the track is stored as a digital value, a strain pattern of the electro-mechanical converting element at that time is detected by a strain detecting sensor mounted on the element, and the strain pattern of the electro-mechanical converting element corresponding to the track curve is similarly stored as a digital value. Thus, even when the head reaches the editing point and the head is set into the recording mode, the closed loop control can be also executed so as to form a new recording track by the same pattern as the curve pattern of the track just before the editing point. The stable control system can be constructed.

BRIEF DESCRIPTION OF THE DRAWINGS

FIG. 1 is a block diagram of an embodiment of an electronically controlled magnetic tape editor according to the present invention;

DESCRIPTION OF THE PREFERRED

Figure 2A:
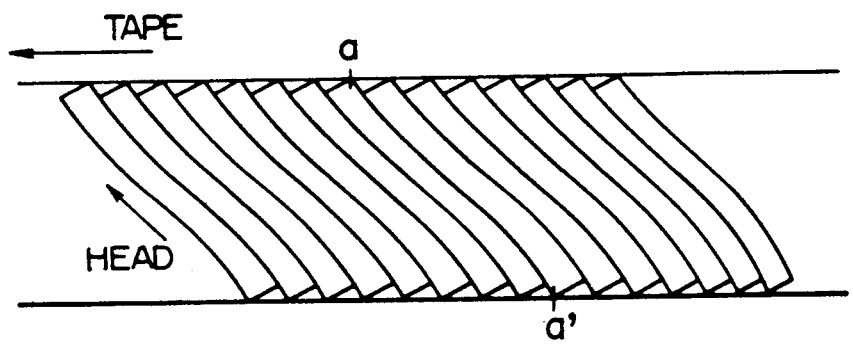
FIGS. 2A to 2C are explanatory diagrams of a recording track pattern on a tape and a track pattern in an electronically controlled magnetic tape editor.
Figure 2B:
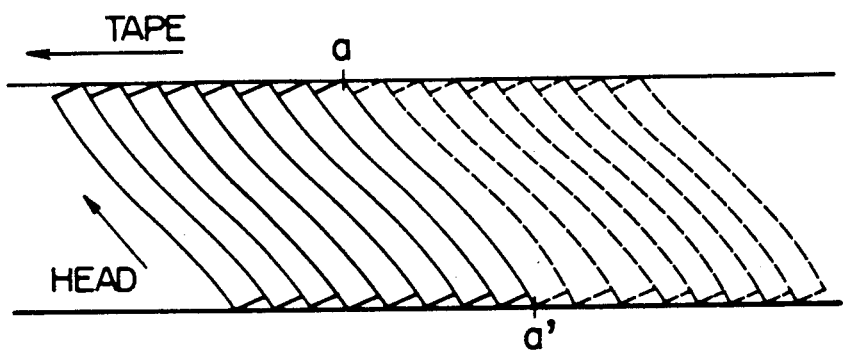
Figure 2C:
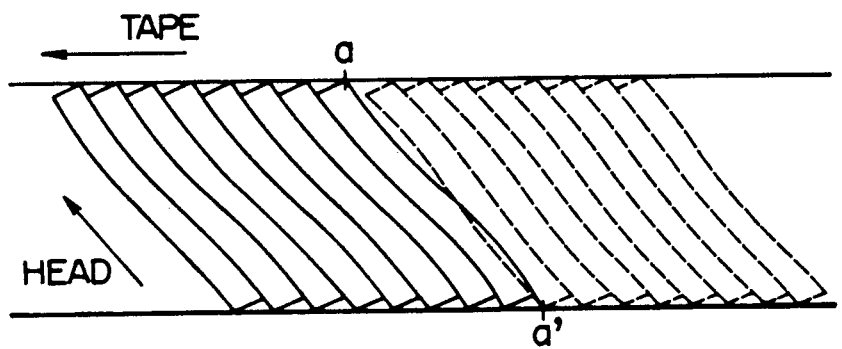

FIG. 2A shows recording tracks on a magnetic tape which were recorded by a helical scan type video tape recorder (VTR). In FIG. 2A, a consideration is given with respect to the case where a new signal is recorded onto a region after a position a-a' of the tape in the assemble mode. In the case of executing the electronic editing operation by the same VTR as the VTR which was used to record the recording tape of FIG. 2A, the curves of the tracks which were newly recorded and the curves of the tracks which had already been recorded have a similar tendency as shown in FIG. 2B, so that fluctuations of the recording track patterns before and after the editing point a-a' do not occur generally. However, in the case of performing the electronic editing operation by a VTR different from the VTR which was used to record the recording tape of FIG. 2A, since the curve patterns of the linearity of the recording tracks differ depending on different VTRs, the curve patterns of the recorded tracks before and after the editing point a-a' differ as shown in FIG. 2C. Thus, the recorded tracks partially overlap at the editing point or the guard between tracks is widened, so that a fluctuation occurs in the recording pattern and upon reproduction, a fluctuation occurs in the reproduced image at the editing point.

In this embodiment, when performing electronic editing, even if the electronic editing is executed by a VTR different from the VTR which was used to record first, the curve patterns of the recorded tracks before and after the editing point do not change as shown in FIG. 2B and the uniform track pattern can be formed at the positions before and after the editing point. To realize the above construction, the magnetic head is mounted on an electro-mechanical converting element such as a piezoelectric element, the reproduction is started from the position before the editing point in conformity with the curve of the recording track, a deviation amount of the electro-mechanical converting element corresponding to the curve of the track is detected, the deviation amount for the whole length of the track just before the editing point is stored as a digital value into a memory, the magnetic head is set into the recording mode when the head arrives at the editing point, and the closed loop control is executed so as to obtain the same deviation amount as the deviation amount of the electro-mechanical converting element which conforms with the curve of the track just before the editing point.

A practical embodiment of the invention will now be described with reference to FIG. 1.

In the case of performing electronic editing, the reproduction is first started from the position on the left side of the point a-a' in FIG. 2 and the reproduction tracking along the curve of the recorded track is started. In this state, a reproduction signal reproduced from a head 1 passes through a contact $P_2$ of a switch 19 and is amplified by a preamplifier 5. The signal is then led to a tracking error detector 6, by which a tracking error signal is detected (which will be explained hereinlater). The tracking error signal passes through a contact $P_3$ of a switch 7 and is led to a comparator 8, so that an output of $+1$ or $-1$ is derived from the comparator 8. A memory circuit 9 is used to store as a digital value the information corresponding to the track curve of one track. For instance, assuming that one track is sampled from ten positions at regular intervals and each sample is digitized to six bits, the curve pattern can be stored by $\pm 32$ (total 64) gradations. At the reproduction start point, the value of each sample in the memory is set to 0. If the output of the comparator after the start of the reproduction assumes $+1$ at a certain sample point, 1 is added to the value at this sample point (if the output of the comparator is $-1$, 1 is subtracted from the value at the sample point).

An output of the memory circuit 9 is read out after one track was scanned. The output is then D/A converted and an electro-mechanical converting element 2 is actuated through an adder 11 and a driving amplifier 12. At this time, since the electro-mechanical converting element is actuated in the tracing direction of the track curve on the basis of the output of the memory circuit 9, so that a tracking error is also changed. At this time, if the output of the comparator 8 is likewise $+1$ the same sample point as that upon preceding scan, 1 is further added to the value at the same sample point of the memory circuit 9. For the curves of the recorded tracks, since the similar pattern is repeated, by repeating such operations, the memory content of the memory circuit is settled to the content corresponding to the curve pattern of the track. The output of the comparator 8 at the same sample point alternately changes between $+1$ and $-1$ every track. By scanning 32 tracks at most, the memory content is settled into the stationary state. Now, assuming that 64 gradations are selected so as to correspond to the track pitch width, the error of $+1$ corresponds to the tracking error of the accuracy which is equivalent to 1/32 of the track pitch. By further increasing the number of digitization bits, it is possible to trace the track curve at a further higher accuracy. On the other hand, the number of samples of one track can be also further freely increased.

As mentioned above, the reproduction is executed so as to trace the curve of the track before the editing point and the information conforming with the curve pattern of the track is stored into the memory circuit. Thus, the memory content is held by connecting the switch 7 to the side of a contact $P_4$ just before the head reaches the editing point. Due to this, even when the edition recording is started, the same track curve information is read out of the memory circuit 9 every scan of the head and the electro-mechanical converting element 2 is actuated by the similar curve pattern.

On the other hand, strain information derived from a strain sensor 4 to detect the strain of the electro-mechanical converting element 2 is transferred to a differential amplifier 14 through a sensor amplifier 13. A level difference between the strain information and an output of a D/A converter 17 is obtained as an output of the differential amplifier 14 and is led to a comparator 15 through a contact $P_7$ of a switch 21. Although not shown, an edge of the element 2 on the side opposite to an edge at which the magnetic head 1 is mounted is fixed to a rotary cylinder (not shown).

A memory circuit 16 has a construction similar to that of the memory circuit 9. It is assumed that one track scanning period is divided into equal parts and is set to, for instance, ten sample points and each sample is stored as six bits. When an output of the comparator 15 is set to +1, 1 is added to the memory value at the corresponding sample point (in the case of −1, 1 is subtracted). Information in the memory circuit 16 is read out with a delay time corresponding to one track upon scanning of the next track and is D/A converted and is led to the differential amplifier 14. By repeating the above operations every track scan, the electromechanical converting element traces the track curve and the same pattern is repeated every track scan. Due to this, the information corresponding to the strain pattern of the electro-mechanical converting element is digitally stored into the memory circuit 16. The switch 21 is switched to the side of a contact $P_8$ at the timing just before the editing point and the strain pattern at the position just before the editing point is held into the memory 16.

As mentioned above, at the position before the editing point, the switches 7, 18, 19, and 21 are respectively connected to the contacts $P_3$, $P_6$, $P_2$, and $P_7$. The information conforming with the track curve as much as one track is stored into the memory circuits 9 and 16. The switches 7 and 21 are respectively switched to the contacts $P_4$ and $P_8$ at the position just before the editing point. The memory contents of memory circuits 9 and 16 at the position just before the editing point are held. When the head reaches the editing point, the switch 19 is connected to the contact $P_1$ and the head 1 is set into the recording mode and a signal of a recording amplifier 20 is supplied to the head. On the other hand, the switch 18 is also switched to a contact $P_5$ and the output of the differential amplifier 14 is led to the adder 11. The information corresponding to the track curve which was stored in the memory circuits 9 and 16 is read out every track scan in accordance with the rotational phase of the head.

Therefore, the converting element 2 is actuated on the basis of a pattern similar to the track curve just before the editing point in accordance with the curve information just before the editing point which was read out of the memory circuit 9. The strain of the converting element 2 at this time is detected by the strain sensor 4 in a manner similar to the above. The difference between the information obtained by reading the curve information stored in the memory circuit 16 and the detected strain is derived from the differential amplifier 14 and is led to the adder 11 through the contact $P_5$ of the switch 18 and is added to an output of a D/A converter 10.

The closed loop control is executed so as to minimize the output of the differential amplifier 14 by using the curve pattern information stored in the memory circuit 16 as a reference signal and the stable control system is constructed. Even if the control loop comprising the components 13 to 18 does not exist, the recorded tracks conforming with the curve of the track just before the editing point can be formed by the open loop control system comprising the parts 3 and 9 to 12. However, it is difficult to construct a stable control system because such an open loop control system is unstable for disturbances such as fluctuation of the power source voltage, noises, and the like (the loop comprising the parts 4 and 13 to 18 constructs a feed back loop).

After the editing point, the head scan conforming with the track curve just before the editing point can be executed by the stable closed loop control as mentioned above. The recording signal is led to the head 1 through the recording amplifier 20 and switch 19 and a new signal recorded track is formed on the tape.

Figure 3A:
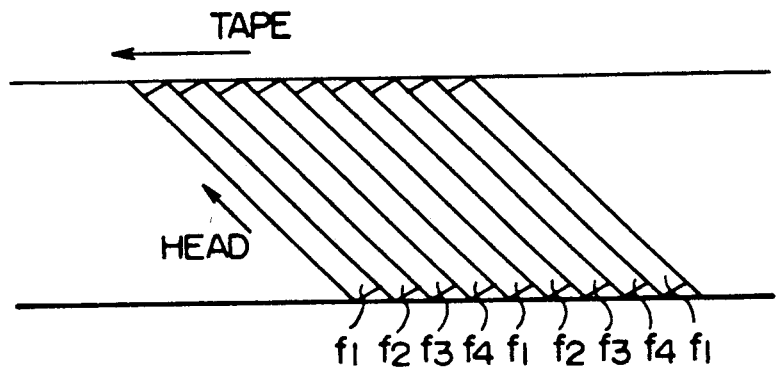
FIG. 3A is an explanatory diagram of a pilot signal which is recorded onto each track.

The tracking error signal detector 6 in FIG. 1 will now be described with respect to a practical example of FIG. 3. FIG. 3A shows a track pattern recorded on the tape and the kind of pilot signal recorded on each track together with the signal.

The pilot signals of four frequencies $f_1$, $f_2$, $f_3$, and $f_4$, which are also used in an 8-mm video tape recorder, are sequentially cyclically recorded on the recording tracks. There are the following relations among the four kinds of pilot signals.

$$F_1 = f_2 - f_1 \approx f_3 - f_4$$

$$F_2 = f_3 - f_2 < f_4 - f_1$$

where, $f_1 < f_2 < f_4 < f_3$

Figure 3B:
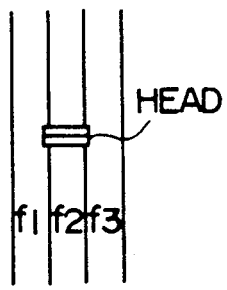
FIG. 3B is an explanatory diagram of a head scanning state.
Figure 3C:
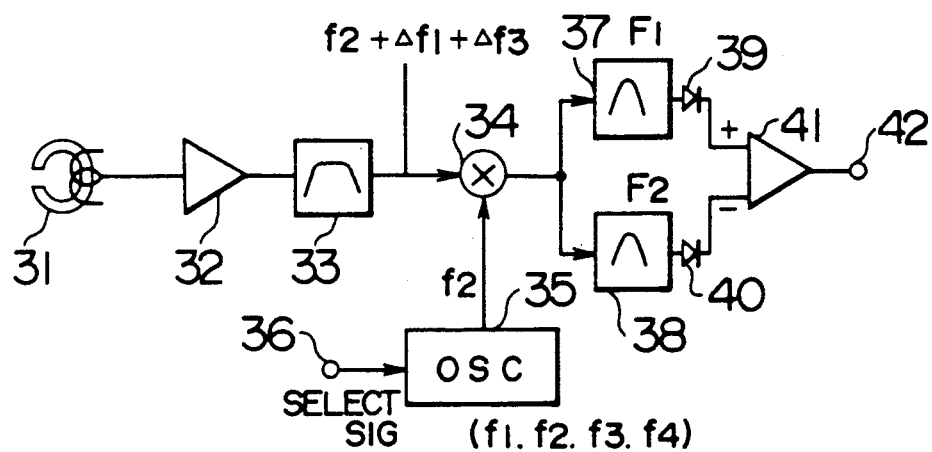
FIG. 3C is a block diagram of a tracking error detecting circuit.

In addition to the setting as mentioned above, as shown in FIG. 3C, the signal reproduced by a head 31 is amplified by a preamplifier 32 and is transmitted through a band pass filter 33 to separate the pilot signal band, thereby extracting the pilot signal. The pilot signal is led to a heterodyne circuit (multiplier) 34 and multiplied with a signal from a reference pilot frequency oscillator 35. The differential frequency component is led to a band pass filter 37 having a center frequency of $F_1$ and a band pass filter 38 having a center frequency of $F_2$. Outputs of the filters 37 and 38 are detected by detectors 39 and 40, respectively. The detected outputs are led to a differential amplifier 41 and a tracking error component is derived at an output terminal 42. A consideration will now be made with respect to the case where the reproducing head is scanning the pilot signal of the frequency $f_2$ along the track on which the pilot signal was recorded as shown in FIG. 3B. As the reproduced pilot signal, the pilot signal of $f_2$ is mainly reproduced and the pilot signals (which are respectively expressed by $\Delta f_1$ and $\Delta f_3$) of the frequencies $f_1$ and $f_3$ are also reproduced as leakage signals from the right and left adjacent tracks. Thus, an output of the band pass filter 33 in FIG. 3C is $f_2 + \Delta f_1 + \Delta f_3$. At this time, assuming that the signal frequency of the reference pilot frequency generator 35 is $f_2$, outputs of $\Delta(f_2 - f_1)$ and $\Delta(f_3 - f_1)$ are obtained from the multiplier 34. $\Delta(f_2 - f_1)$ is separated by the band pass filter 37 and $\Delta(f_3 - f_1)$ is separated by the band pass filter 38. That is, the pilot signal levels due to the leakage from the right and left adjacent tracks are input to the differential amplifier 41. The information corresponding to the tracking error is obtained as an output of the amplifier 41. In the ordinary reproducing mode, the signal at the terminal 42 is also used as a capstan driving signal, a closed loop is constructed, and the stable tracking control is executed.

A control signal to sequentially switch the oscillating frequency of the reference oscillator 35 is accordance with the order of $f_1$, $f_2$, $f_3$, and $f_4$ every track scan is input to a terminal 36. As shown in the foregoing tractical example, the tracking error signal can be continuously extracted over the whole length of the track. It is not always necessary to continuously detect the tracking error signal. It is also possible to use a method whereby tracking errors can be detected from a few sample points on the whole length of the track.

Practical examples of the electro-mechanical converting element and the strain detecting sensor thereof will now be described with reference to FIG. 4.

Figure 4A:
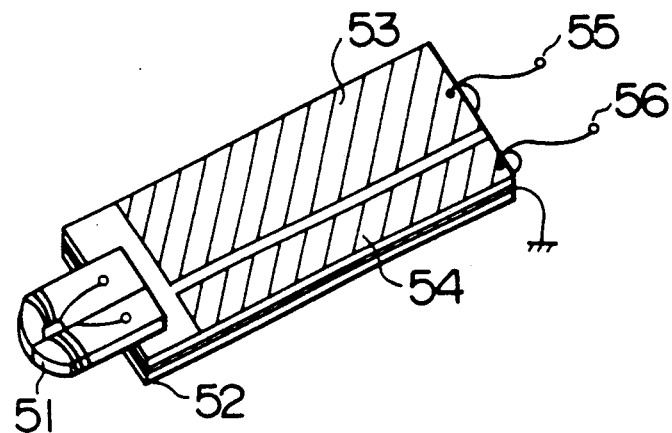
FIGS. 4A to 4C are constructional diagrams of a strain detecting sensor.
Figure 4B:
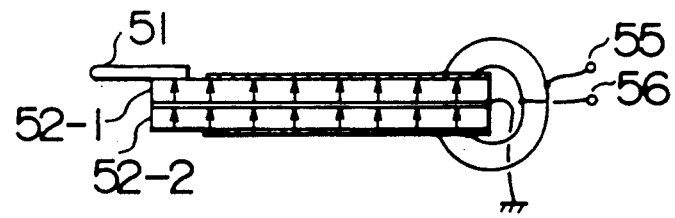
Figure 4C:
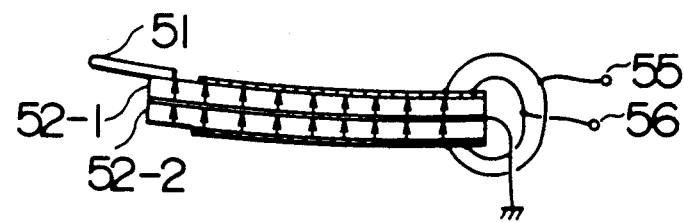

FIG. 4A is a perspective view of the element. Reference numeral 51 denotes a magnetic head; 52 indicates an electro-mechanical converting element; 53 an electrode for driving the converting element; 54 an electrode for detecting the strain of the converting element; and 55 and 56 lead terminals of the electrodes 53 and 54. As shown in FIG. 4B, the electro-mechanical converting element 52 is constructed by adhering two piezoelectric elements 52-1 and 52-2 which are polarized in the direction of arrows and an electrode which is commonly used for the two piezoelectric elements 52-1 and 52-2 is attached to the confronting surfaces of the piezoelectric elements. As shown in FIGS. 4A and 4B, the electrodes 53 and 54 are separately attached to the upper and lower surfaces of the adhered piezoelectric elements (an electrode is also similarly attached to the lower surface). The electrodes on the upper and lower surfaces are respectively connected by lead wires and are provided with the terminals 55 and 56. An edge of the converting element 52 on the side opposite to the edge at which the head is attached is fixed. For such an electro-mechanical converting element, when the common terminal of the confronting surfaces is connected to the ground and a driving voltage is applied to the terminal 55, for instance, the element 52-1 is compressed and the element 52-2 is extended. Thus, as shown in FIG. 4C, the head attaching edge is curved upwardly and the head is upwardly moved. Since the piezoelectric elements are deformed as mentioned above, an electromotive force is generated between the electrode 54 mounted on the piezoelectric elements and the confronting common surface (ground). Therefore, the electrode 54 functions as a strain detecting sensor of the electro-mechanical converting element. Such an element has been shown in JP-A-52-117105 and is suitably applied to the present invention. By attaching a semiconductor strain sensor onto the electro-mechanical converting element in place of the electrode 54, the distortion corresponding to the strain of the electro-mechanical converting element can be also detected.

Although the above embodiments have been described with respect to the case of one head, even if a plurality of recording and reproducing heads are used, it is obviously sufficient to use a plurality of the above-mentioned constructions. Although the above description relates to the operation upon of the electronically controlled editor in the assemble mode, a stable editing operation can also be attained in the insertion mode with an assured uniform curvature of the tracks before and after the end point of insertion.

We claim:

1. An electronically controlled magnetic tape editing device for a magnetic tape recorder/reproducer of helical scan type, comprising:
   at least one magnetic head;
   a first memory to store curvature information of a reproduced track derived from said magnetic head;
   an electro-mechanical converting element which has said magnetic head mounted thereon and which is actuated in response to an output of said first memory;
   a strain sensor for detecting mechanical strain in said electro-mechanical converting element;
   a second memory for storing an output of said strain sensor for at least one reproduced track; and
   an auxiliary circuit for actuating said electro-mechanical converting element to cause the output of said strain sensor in an editing recording operation to be coincident with the output of said strain sensor stored in the second memory while reproducing the track before an editing point in the tape,
   wherein when said magnetic head is set for reproducing recorded tracks, both curvature information and the output of said strain sensor relating to the track before said editing point for a predetermined time period prior to the editing operation are stored respectively into said first memory and said second memory and when said magnetic head reaches said editing point, said magnetic head is set for recording new records to be edited onto the track.

2. An editing device according to claim 1, further comprising a first switch and a second switch, wherein until said magnetic head reaches the editing point, the first memory is connected to the magnetic head by turning on said first switch and the second memory is connected to said strain sensor by turning on said second switch, and when the head reaches the editing point, said first and second switches are turned off.

3. An editing device according to claim 1, wherein said electro-mechanical converting element is constructed by adhering two piezoelectric elements to one another.

* * * * *